United States Patent

[11] 3,586,441

[72] Inventors Stanley Babcock Smith
Lexington;
Jerrold Zindler, Cambridge; Rauf Argon,
Beford; David E. Blackmer, Weston, all of,
Mass.
[21] Appl. No. 652,976
[22] Filed July 12, 1967
[45] Patented June 22, 1971
[73] Assignee Instrumentation Laboratory, Inc.
Watertown, Mass.

[54] ATOMIC ABSORPTION SPECTROANALYSIS SYSTEM
16 Claims, 15 Drawing Figs.

[52] U.S. Cl. .................................................. 356/97,
356/87, 356/95
[51] Int. Cl. ...................................................... G01j 3/42
[50] Field of Search ........................................... 356/87, 88,
93—98, 187; 110/173 B; 431/26

[56] References Cited
UNITED STATES PATENTS
2,043,808   6/1936   Norton et al. ................... 110/173 (B)
3,082,813   3/1963   Hamelink ....................... 431/26
3,082,814   3/1963   Pinckaers ....................... 431/26
3,137,758   6/1964   Mason et al. ................... 356/95
3,469,789   7/1969   Simmons ........................ 356/87 UX OTHER REFERENCES
Stewart et al., JOURNAL OF LABORATORY AND CLINICAL MEDICINE, Vol. 61, No. 5, May 1963, pp. 858— 872

Maurodineanu: DEVELOPMENTS IN APPLIED SPECTROSCOPY Vol. 5, " Preceedings of the Sixteenth Annual Mid-America Spectroscopy Symposium," (held in Chicago, Illinois, Jun. 14— 17, 1965) Edited by Pearson and Grove, 1966 pp. 385— 392 relied on Negus, " Chemical Analysis by Inferential Techniques," INSTRUMENTS AND CONTROL SYSTEMS, Vol. 37 Aug. 1964, pp. 87— 96

*Primary Examiner*—Ronald L. Wibert
*Assistant Examiner*—F. L. Evans
*Attorney*—Willis M. Ertman

ABSTRACT: An atomic absorption spectroanalysis system includes a burner for generating a flame, two radiation sources, and two pairs of radiation sensors. An optical system passes radiation from each source along a first path through the flame for sensing by a corresponding sensor to produce an I signal, and along a second path outside the flame for sensing by a corresponding second sensor to produce an $I_o$ signal. The radiation output of each source is modulated and the output signals from each sensor are demodulated and then logarithmically combined to provide two log $I/I_o$ signals. Compensation circuitry connected to the logarithmic circuit arrangement provides compensation for radiation absorption deviations of the radiation passing through the flame as a function of Beer's Law. The system also includes circuitry for providing a zeroing adjustment of each log $I/I_o$ signal while a known standard or blank is being introduced into the flame.

PATENTED JUN 22 1971

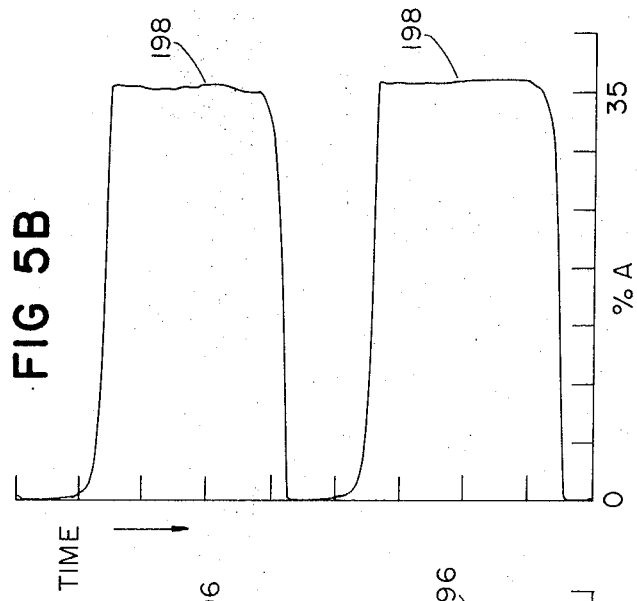
FIG 5A
FIG 5B
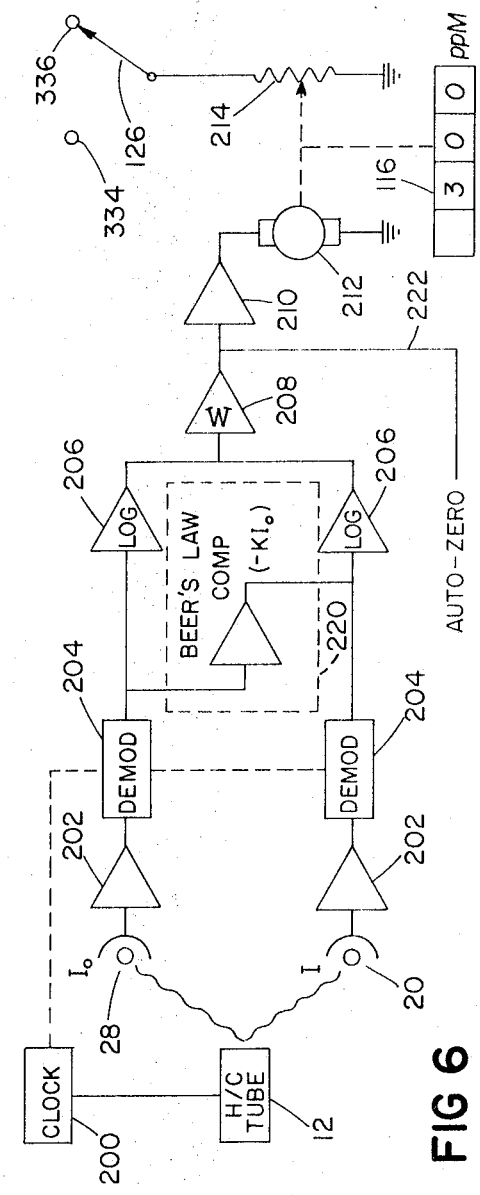
FIG 6
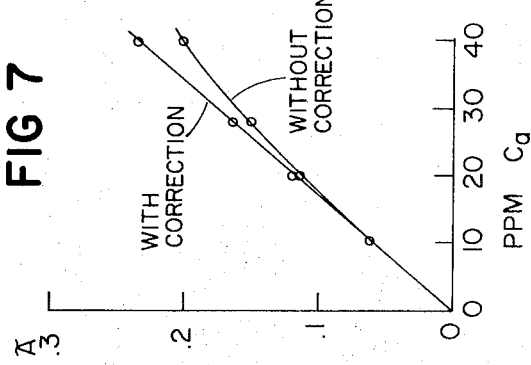
FIG 7

3,586,441

ATOMIC ABSORPTION SPECTROANALYSIS SYSTEM

This invention relates to spectroanalysis apparatus and more particularly to spectroanalysis apparatus that employ atomic absorption phenomena.

An object of the invention is to provide novel and improved spectroanalysis apparatus of the atomic absorption type which includes correction for errors due to changes in radiation source intensity and/or to variations in the flame configuration and/or constituents.

Another object of the invention is to provide novel and improved spectroanalysis apparatus of the atomic absorption type that incorporates logarithmic conversion of data and manipulation of the data on that basis for improved accuracy of results.

Still another object of the invention is to provide a novel and improved atomic absorption instrument arrangement which facilitates the control and operation of the instrument for spectroanalysis purposes.

Still another object of the invention is to provide improved ignition and flame control arrangements which increase the safety and accuracy of the flame system.

A further object of the invention is to provide novel and improved instrument that incorporates novel and improved mechanism to provide "Beer's Law" compensation.

The invention features a spectroanalysis system in which a beam of light is passed through a flame and the absorbance of that light by constituents of the flame is detected by suitable monochromator apparatus. Two light sources and four detectors are utilized. With respect to each light source light radiation that does not pass through the flame is sensed by a first detector and radiation is sensed by a second detector after it has passed through the flame. The paths of radiation through the flame from the two light sources are coincident. With respect to each light source, the radiant energy is detected in two channels and a synchronous demodulation and logarithmic amplifier arrangement is employed to establish a signal ratio that enables the stability of the light source to be continuously monitored and compensation for any changes in that source to be made automatically. The corrected value is applied to a suitable display device. The dual channel facilities enable an internal standard to be introduced in the fuel mixture for monitoring the flame characteristics. Further the circuitry is arranged to provide ready compensation for "Beer's Law" absorbance.

Further specific features of the invention include an ignition system employing a safety arrangement that insures the existence of proper fuel conditions prior to ignition, a frangible wall in the fuel mixing chamber which isolates and minimized the damage resulting from uncontrolled rapid combustion if such condition should occur, and an orifice fuel control arrangement which increases the stability of the flame configuration.

The invention provides an atomic absorption spectroanalysis instrument of substantially greater accuracy and versatility than instruments heretofore available.

Other objects, features and advantages of the invention will be seen as the following description of a particular embodiment progresses, in conjunction with the drawings, in which:

FIG. 5 is a graph indicating the improvement in system operation obtained through the use of orifice type flow control;

FIG. 6 is a block diagram of a typical channel employed in the instrument shown in FIG. 1;

FIG. 7 is a graph indicating the nature of "Beer's Law" compensation employed in the instrument shown in FIG. 1;

Figure 1:
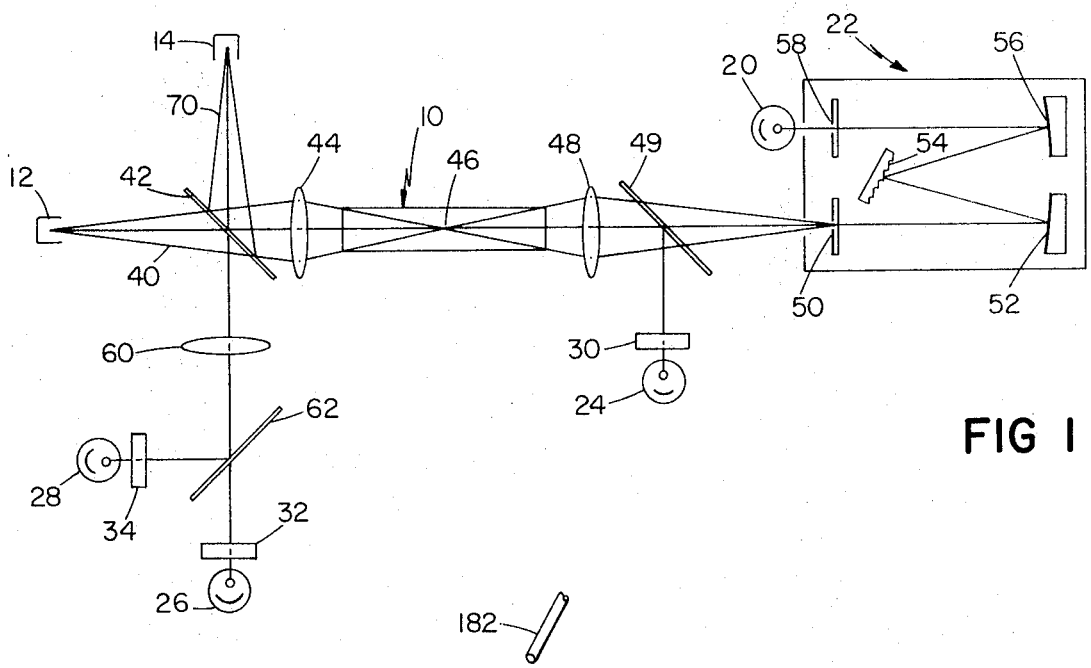
FIG. 1 is a schematic diagram of an atomic absorption spectroanalysis instrument constructed in accordance with the invention.

With reference to FIG. 1 there is shown an atomic absorption system employing a flame source in the form of burner 10. Two radiation sources 12, 14 are employed which in this particular embodiment are hollow cathode tubes of the type conventionally employed in atomic absorption instruments. Each hollow cathode tube emits a specific wavelength of light related to an element of significance in the flame at burner 10. For example, hollow cathode tube 12 may emit a wavelength associated with calcium while hollow cathode tube 14 may emit a wavelength associated with strontium.

The system, in addition, includes radiation sensor 20 of the photomultiplier type associated with a one-third meter Ebert monochromator 22; and radiation sensors 24, 26 and 28 of the photodiode type. Positioned in front of photodiode 24 is a filter 30 that passes only a particular wavelength of source 14. A similar filter 32 is positioned in front of photodiode 26 while the filter 34 positioned in front of photodiode 28 passes only radiation of the wavelength output of hollow cathode tube 12.

The output beam 40 from tube 12 passes through a quartz beam splitter 42 and is focused by spherical quartz lens 44 (of 64 millimeters focal length at the sodium D line) for passage through the flame from burner 10 so that the image of the aperture of tube 12 is located at the center of the flame at point 46. In this embodiment the aperture of tube 12 is located 160 millimeters from lens 44 and the image 46 is located 90 millimeters from lens 44. A second lens 48 (identical with lens 44) focuses the beam of light at a point for passage through the flame and through beam splitter 49 to entrance slit 50 of monochromator 22. In the monochromator a beam of light is reflected by mirror 52 onto grating 54 and reflected from that grating to mirror 56 for passage through exit aperture 58 and sensing by photomultiplier tube 20.

The beam splitter 42 reflects a second portion of beam 40 through a spherical quartz lens 60 of 50 millimeters focal length for reflection by beam splitter plate 62 and passage by filter 34 for sensing by photodiode 28. This radiation path bypasses the flame and is used to monitor the output of the hollow cathode tube 12 independently of the flame.

The beam 70 of radiation from hollow cathode tube 14 passes through beam splitter 42 and, as focused by lens 60, through beam splitter 62 and filter 32 for sensing by photodiode 26 in an optical path that has the same optical characteristics as the path associated with photodiode 28. A second portion of beam 70 is reflected by beam splitter 42 for focusing by lens 44 to provide an image of the aperture of hollow cathode tube 14 at point 46 (in the flame) and then reflection by beam splitter 49 for passage by lens 48 and filter 30 for sensing by photodiode 24. The optical dimensions of this beam path are identical with the beam path from hollow cathode tube 12 to monochromator 22.

Figure 2:
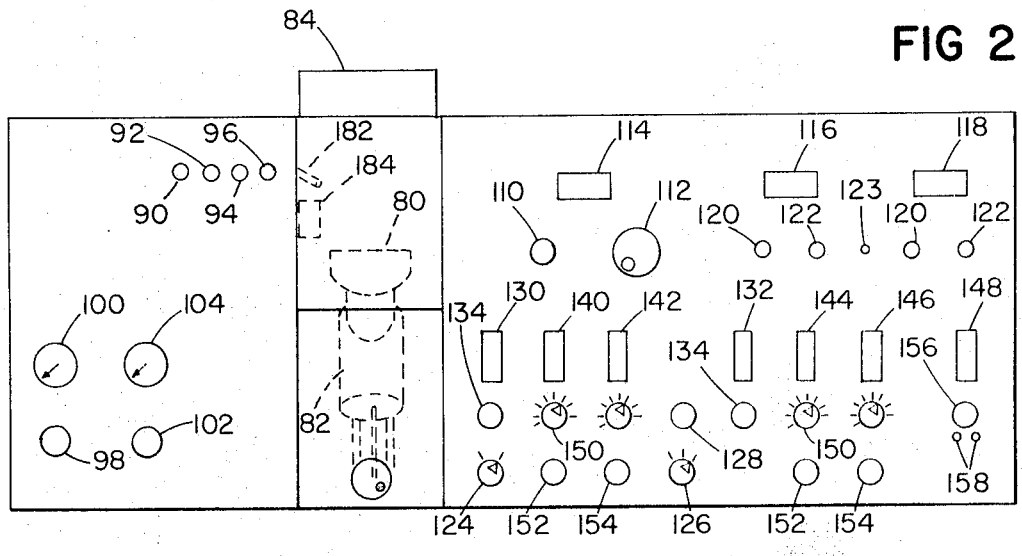
FIG. 2 is a front view of the housing of the atomic absorption instrument constructed in accordance with the invention showing control elements that are provided.

A front view of the instrument housing is shown in FIG. 2. Behind the center panel is housed the flame distributor diagrammatically indicated at 80 (that includes burner 10) and mixing chamber 82 into which the sample to be analyzed is aspirated. An exhaust channel 84 for combustion products of the flame extends above the center panel. In the upper portion of the left-hand panel is a power control switch 90, a hollow cathode tube control switch 92, an oxidant control switch 94 and a flame control switch 96. In the lower portion of the left-hand panel is a control knob 98 and indicator dial 100 for the fuel system and a corresponding control knob 102 and indicator 104 for the oxidant supply. In this instrument the fuel is acetylene ($C_2H_2$) and the oxidant may be either air or nitrous oxide ($N_2O$).

On the right-hand panel in the upper portion is a knob 110 that controls the widths of the entrance slit 50 and the exit slit 58 of the monochromator 22. Knob 112 controls the setting of grating 54, and indicator 114 indicates the wavelength of that grating setting. Indicator 116 is responsive to the output of photomultiplier 20 (channel A) while indicator 118 is responsive to the output of photodiode 24 (Channel B). Associated with each indicator channel is a zeroing control 120 and a calibrating control 122. In addition an automatic zeroing control 123 is provided to automatically set the zero setting of the instrument while aspirating the known (internal) standard or blank.

In the lower portion of the right-hand panel are a Read-Hold switch 124, a mode switch 126 that has three positions (A, B; A, and A/B); and a time constant control 128. In addition, there are two meters 130, 132 which indicate the current applied to the hollow cathode tubes of channels A and B respectively as controlled by knobs 134. Other meters include meter 140 responsive to the output of photomultiplier 20, and meter 142 responsive to the output of photodiode 28 (Channel A); meter 144 responsive to the output of photodiode 24 and meter 146 responsive to the output of photodiode 26 (Channel B); and meter 148 which provides an indication of the magnitude of the $I_o$ reference signal in Channel B. Directly below each meter 140—146 is a corresponding control knob 150 which adjusts the gain of the circuit coupled to the respective photosensor.

Other controls include a scale expansion control 152 for each channel, a curve corrector control 154 for each channel; and a test point control 156 for selecting any one of a number of test points in either channel which selected test points can be connected by a jack inserted in either channel plug 158.

Figure 3:
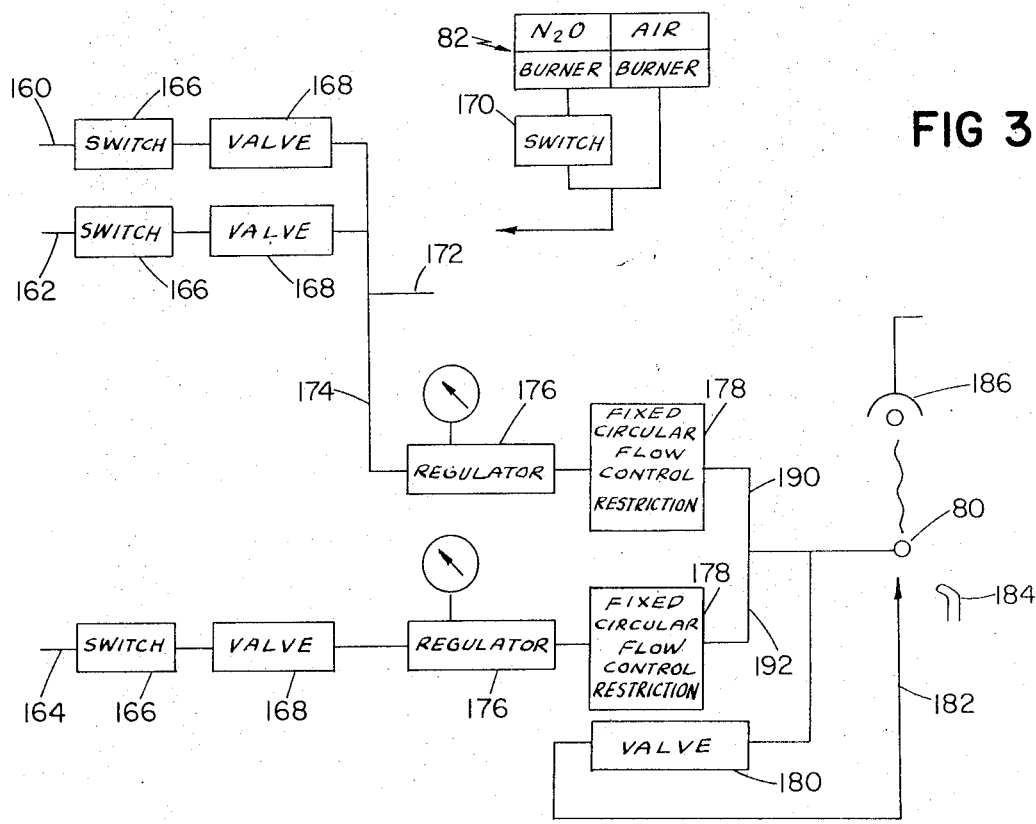
FIG. 3 is a schematic block diagram of the flame control system employed in the instrument shown in FIG. 1.

FIG. 3 is a block diagram of the flame control system which in this embodiment allows selection of either air over line 160 or nitrous oxide over line 162 as the oxidant; and acetylene over line 164 as the fuel. Each supply line includes a safety switch 166 and a solenoid controlled valve 168. The safety switch prevents flow and hence flame if the pressure in any line is too low. A further safety interlock 170 is responsive to a particular burner configuration and when the oxidant is nitrous oxide, safety switch 170 is activated only when the proper burner is in proper position on chamber 82. An aspirator tube 172 is connected to the oxidant line 174. Regulators 176 in the oxidant line 174 and in the fuel line 164 control the pressure of fluid for flow through a circular flow control orifice 178 in each line (the oxidant orifice having a diameter of 0.032 inch and the fuel orifice having a diameter of 0.024 inch) to the burner structure 80. A pilot fuel line 182 controlled by solenoid 180 supplies the fuel into the vicinity of burner 80 for ignition by spark ignition structure 184. The flame is monitored by flame detector 186 and fuel flow is automatically terminated if flame is absent for a predetermined time interval.

Figure 4:
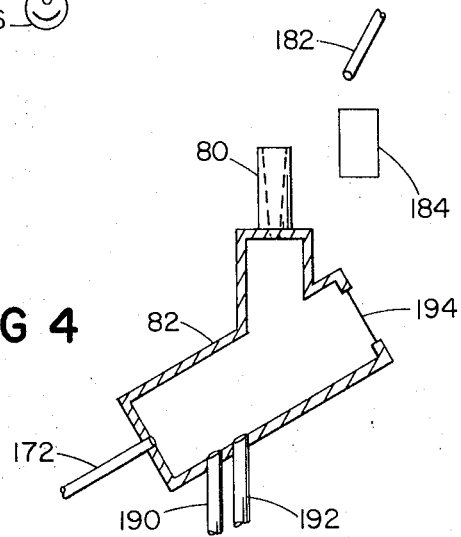
FIG. 4 is a diagrammatic view of the ignition and burner structure employed in the instrument shown in FIG. 1.

A diagrammatic sectional view of the burner system is indicated in FIG. 4. That system includes a mixing chamber structure 82 on which the burner head 80 is mounted. Fuel line 190 and oxidant line 192 are connected to mixing chamber 82 as is aspirator input line 172. The upper end wall of mixing chamber 82 is a frangible diaphragm 194 which ruptures in case of excessive pressure buildup in the mixing chamber 82. Disposed above the burner outlet structure 80 is a pilot fuel line 182 and an automatic spark ignition structure 184. Structure 184, when button 96 is depressed repetitively generates an electric arc to pilot line 182 which ignites the fuel mixture flowing through pilot line 182 which in turn ignites fuel mixture flowing through the main burner 80. If no flame has been established after 12 seconds, ignition automatically ceases and the system returns to safety shutdown condition.

The improvement in stability of system operation obtained through the use of orifices 178 is indicated in FIG. 5, showing a comparison between a system using orifice control and a system employing needle valve control. In the system operation shown in FIG. 5A, employing needle valve flow control, a four parts per million of aqueous calcium sample was aspirated and the system was set to give an absorption of approximately 35 percent, producing an output signal as indicated at 196. This same condition of concentration and absorption were used in the recording shown in FIG. 5B which incorporated orifices 178 in the flow paths and produced the output signal indicated at 198.

FIG. 6 is a block diagram of a channel of the instrument. Clock 200 is a square wave source and its output modulates hollow cathode tube 12. The output of that tube is sensed by a reference photodiode 28 and photomultiplier 20. The output signals from these sensors are amplified by amplifiers 202 and synchronously demodulated by demodulators 204. The resulting DC signals are then converted by amplifiers 206 that have a logarithmic response and are combined in summing network 208 to provide a ratio log $I_o/I$. The output of summing circuit 208 is applied to servoamplifier 210 which operates servomotor 212 to adjust potentiometer 214 and generate an output signal indicative of the ratio $I_o/I$ for display on meter 116. Line 222 provides input for automatic zeroing in response to control 123. The channel also includes a Beer's Law compensation network 220 which introduces a compensating voltage through the inputs to the log amplifiers 206 as a function of the following series of equations;

$$I^* = I_o e^{-\alpha} + I_N \quad (1)$$
$$I = I^* - I_N = I_o e^{-\alpha} \quad (2)$$
$$I_N = k\, I_o \quad (3)$$
$$I^* - k\, I_o = I_o e^{-\alpha} \quad (4)$$

Where $I^*$ = total intensity measured through flame; $I_o$ = intensity measured at lamp; $I_N$ = component of total intensity measured through flame at an unabsorbed wavelength; $I$ = component of total intensity at absorbing wavelength; $\alpha$ = absorbance; and $k$ = constant for given conditions. A graph indicating the nature of this correction of absorbance as a function of concentration of calcium is indicated in FIG. 7.

Figure 8:
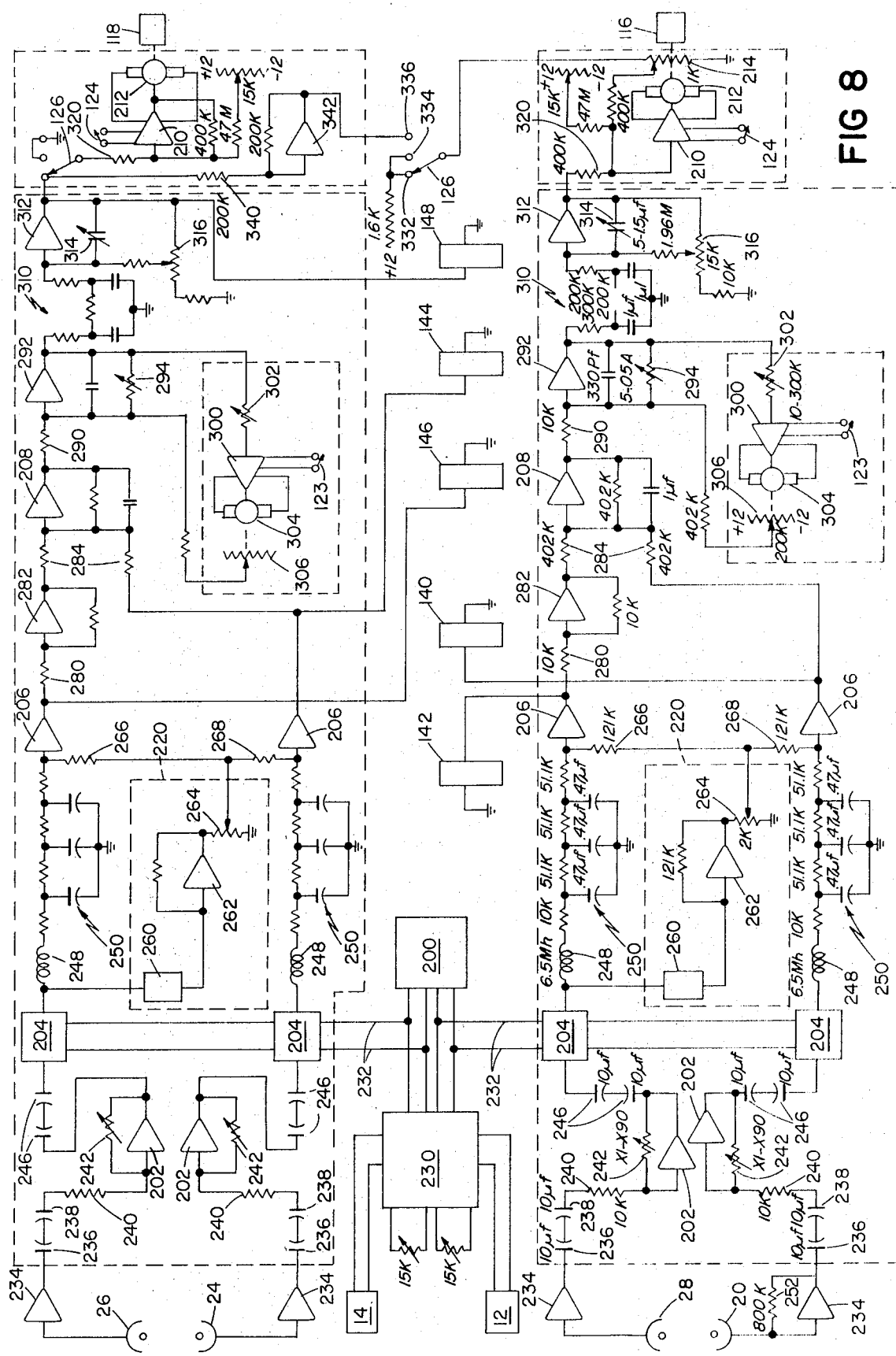
FIG. 8 is a schematic diagram showing electrical circuit arrangements employed in the instrument shown in FIG. 1.

A more detailed electrical schematic of this circuit is indicated in FIG. 8. Clock 200 produces a square wave output at an appropriate frequency in the order of 100—1,000 Hz. to modulate the current of the hollow cathode tubes 12, 14 from power supply 230. The output of the clock is also applied over lines 232 to the demodulator circuits 204. The circuitry associated with each photosensor is similar and therefor the channel circuitry associated with photodiode 28 will be described in detail and significant differences in the circuitry of other photosensors will be noted.

The output of photodiode 28 is applied to a preamplifier 234 through a coupling circuit that includes capacitors 236, 238 and resistor 240 to AC amplifier 202. Amplifier 202 is a feedback amplifier of the "transresistance type" for converting the current provided by sensor 28 to a voltage. The feedback resistance 242 has an effective value in excess of 1,000 megohms and is adjustable, by knob 150, to adjust the gain over a range of eight binary steps. The output of amplifier 202 is coupled by capacitors 246 to demodulator circuit 204 and from there through a filtering network that includes choke 248 and a RC network 250 for application to log amplifier 206. Meter 142 monitors the output of the log amplifier in this circuit.

The circuitry associated with photomultiplier 20 is similar except that a feedback resistor 252 is connected across its preamplifier 234. Gain adjusting resistor 242 in this circuit is controlled by knob 150. Meter 140 monitors the output of log amplifier 206 in this circuit. Also connected between the two circuits in each channel in the Beer's Law compensation network 220 which includes a filter circuit 260, feedback amplifier 262, potentiometer 264 (controlled by knob 154) and a voltage dividing network including resistors 266 and 268 which subtracts a portion of a reference signal ($I_o$) as a function of absorbance so that the absorbance response of the system is a linear function of the concentration.

Channel B, which may be the internal standard channel, associated with sensors 24 and 26, it will be noted, is electrically similar to channel A associated with sensors 20 and 28.

The output of the log amplifier 206 is each circuit that has been affected by the flame constituents is coupled by resistor 280 and inverted by inverter amplifier 282. The two outputs are then coupled by resistors 284 to summing network 208 which provides as an output, the log $I_0/I$ signal. (The sign of the $I_0/I$ signal may be either plus or minus.) That signal is coupled by resistor 290 to scale expander amplifier 292 whose feedback resistance 294 is adjusted by control 152 (FIG. 2). The automatic zeroing circuit responsive to pushbutton 123 includes a servo feedback loop that includes a servoamplifier 300, and adjustable resistor 302, also controlled by knob 152 (FIG. 2), which drives servomotor 304 to adjust potentiometer 306 in an automatic zeroing operation.

The output of scale expander amplifier 292 is applied through a filter network 310 and amplifier 312 which includes adjustable capacitor 314 controlled by time constant control knob 128 (FIG. 2) and servocalibrating potentiometer 316 controlled by the corresponding knob 122 (FIG. 2). The output amplifier 312 is coupled by resistor 320 to servoamplifier 210 which drives servomotor 212 to operate display counter 116 (channel A) or 118 (channel B). Ganged channel selector switch 126 (FIG. 2) has a first position 332 for independent operation of both channels, a second position 334 for operation of only the channel associated with the monochromator 22 and a third position 336 which applies the output of the "internal standard" channel through coupling resistor 340 and inverter amplifier 342 to apply a reference potential on potentiometer 214 to provide compensation for variation in flame conditions. Switch 124 (FIG. 2) allows a particular reading of meters 116 or 118 to be held.

The instrument is relatively simple to operate. The following description will cover the steps for analyzing one element. Two elements may be analyzed simultaneously with the mode control switch 126 in position 332 or an internal standard measurement may be made with the mode selector switch 126 in position 336. However, it is believed that operation of the system may be understood with respect to channel A alone (selector switch 126 in position 334).

For such an analysis, switch 124 is placed in "hold" position (in which it is left except to take readings); hollow cathode current controls 134 are turned all the way counterclockwise; curve corrector controls 154 are set to 0; and power switch 90 is turned on. The appropriate channel A hollow cathode tube 12 is inserted into the instrument and the channel B hollow cathode tube 14 is removed. An appropriate filter 34 is positioned in front of photodiode 28. The hollow cathode tube 12 is turned on by switch 92 and control 134 is adjusted so that meter 130 has the desired reading. While the hollow cathode tube is warming up the alignment of the burner structure 80 may be checked; and the appropriate monochromator wavelength is selected by knob 112 so that the desired wavelength appears at window 114. The slits of the monochromator may also be adjusted by knob 110. Gain controls 150 are adjusted to obtain the desired readings on meters 140 and 142 (the adjustment of meter 140 being correlated with the grating setting and the voltage of the photomultiplier tube 20 if necessary.)

The flame is then initiated by operating switches 94 and 96 and the fuel and oxygen controls 98 and 102 are adjusted to obtain the proper reading on gauges 100 and 104. While a blank solution is being aspirated button 123 may be depressed for a few seconds and switch 124 turned to read position. If the reading on meter indicator 116 is not zero, control 120 is used to zeroize that reading. Further calibration is performed while aspirating a standard solution and scale knob 152 is adjusted to obtain an appropriate reading on meter 140. A check may be run by aspirating a blank solution to see whether the reading returns to zero and if not, the orientation of burner 80 is appropriately adjusted. When this calibration is completed, the instrument is ready for use.

When it is desired to operate in internal standard mode, (switch 126 in position 336) channels A and b are calibrated independently with the mode switch 126 in position 332 and then the switch is moved to position 336 for operation of the instrument with a predetermined amount of a standard component being aspirated into the flame.

Figure 9:
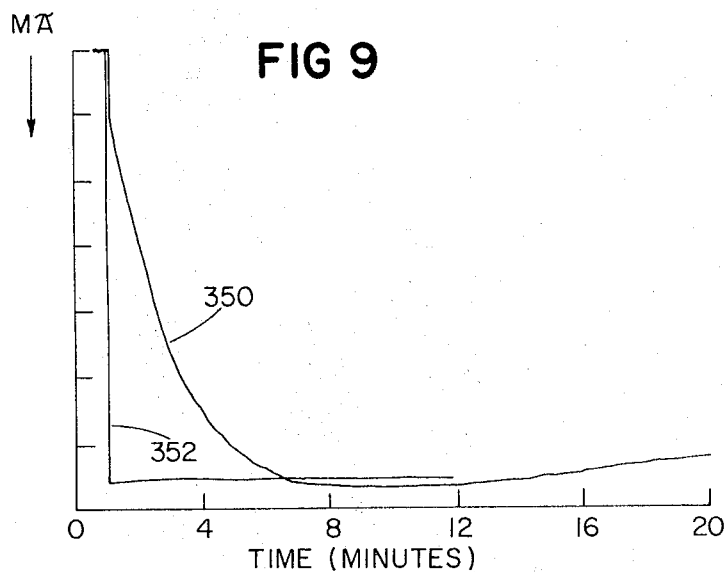
FIG. 9 is a graph indicating readout response of the double beam system according to the invention and a comparable single beam system.

The graph in FIG. 9 shows the readout of the system as set at 0.25 absorbance units full scale with the graph 350 obtained with switch 126 in position 334 and the graph 352 obtained with switch 126 in position 336. In both indicated runs the instrument itself was warmed up and unused hollow cathode lamps were put in position and turned on at the indicated starting point. It will be seen that the double beam system (switch position 336) was ready to use and stable within seconds while the single beam system (switch position 334), while never reaching the equilibrium of the double beam system was in usable condition after about 6 minutes.

Figure 10:
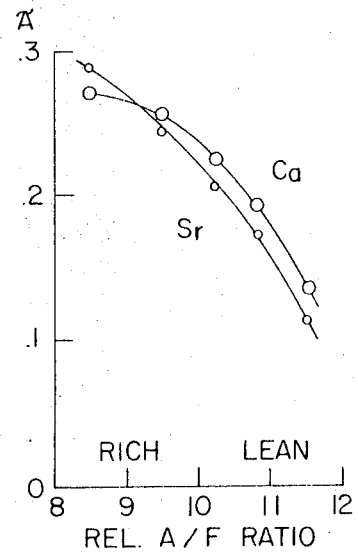
FIGS. 10 and 11 are graphs indicating the response of system shown in FIG. 1 to various air-fuel ratios.
Figure 11A:
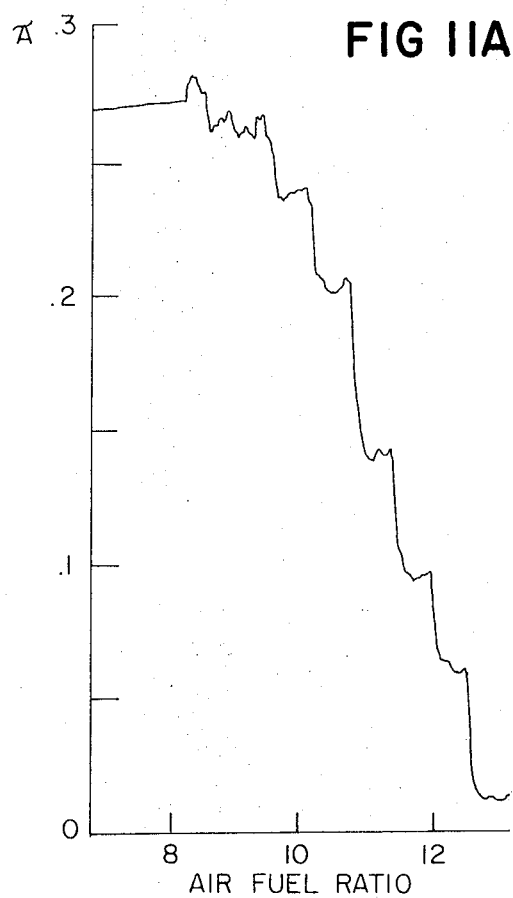
Figure 11B:
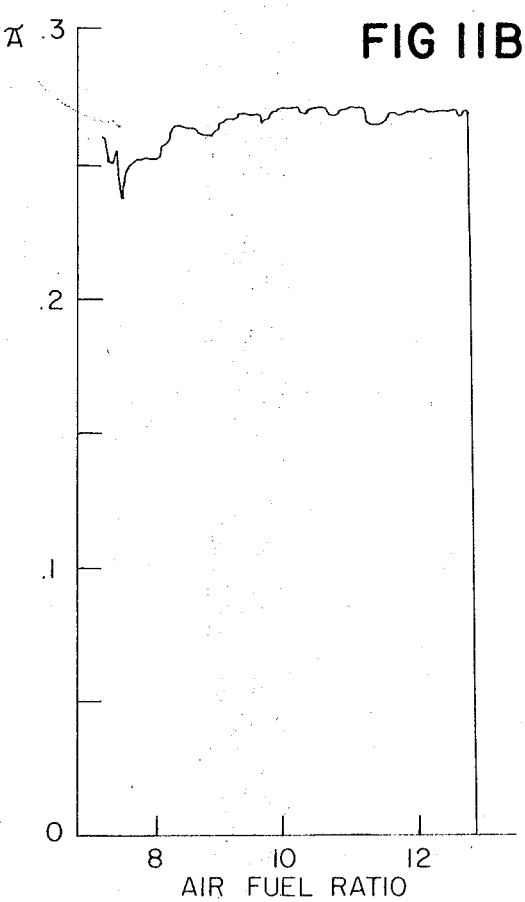

FIG. 10 is a plot of absorbance as a function of air-fuel ratios for strontium and calcium. It will be noted that fuel concentration ratio significantly affects absorbance readings. Further, at relative air-fuel ratios in excess of about 9 the slopes of the strontium and calcium curves are substantially parallel so that either may be used as an appropriate internal standard in a system of this nature. This effect is indicated in the graphs of FIGS. 11A and B, FIG. 11A illustrating response of the system of calcium as a function of air-fuel ratio change without an internal standard while in FIG. 11B employing an internal standard of strontium the intensity ratio increases at the point of crossover of the curves in FIG. 10 but is a reasonably level plateau of readings is obtained over a range of air-fuel ratios of 8:1—12:1.

Figure 12A:
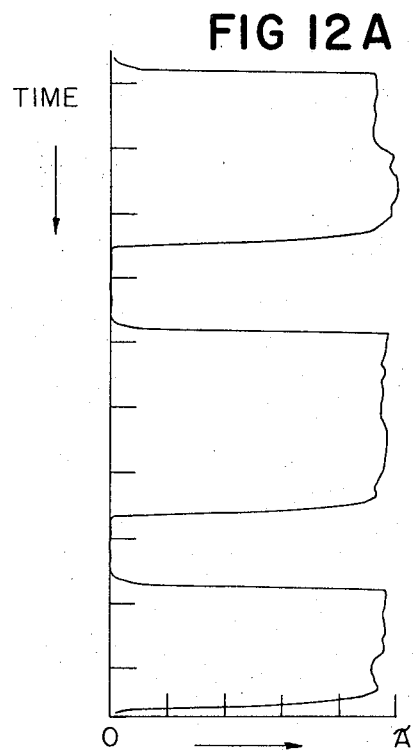
FIG. 12 is a graph indicating the relative stability of the instrument on still another basis.
Figure 12B:
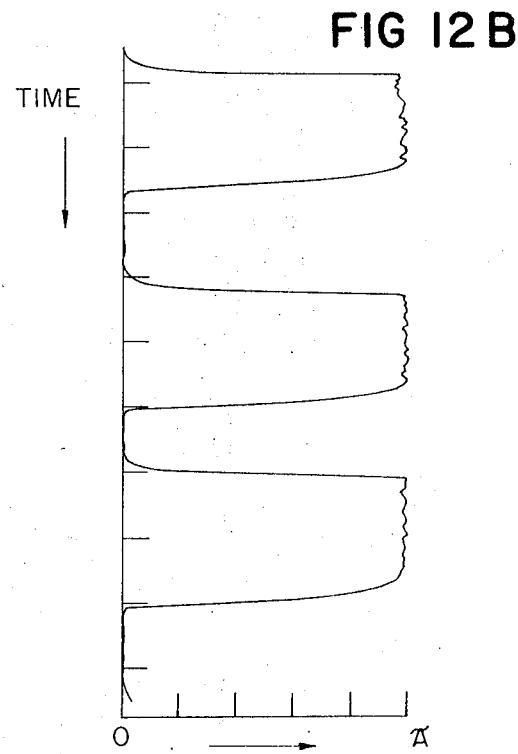

FIG. 12 illustrates, on still another basis, the significance of the internal standard double beam system. Serum was used in both recordings diluted 25:1 with 1 percent EDTA. In both samples strontium was added to the flame as the calibrating constituent. The graph in FIG. 12A shows the calcium absorbance with switch 126 in position 334 and the graph in FIG. 12B shows calcium absorbent standardized with strontium (switch 126 in position 336).

The invention thus provides a versatile spectroanalysis instrument utilizing atomic absorption techniques which incorporates correction for errors due to changes in the hollow cathode intensity and variations within the aspiration and flame configuration to provide a system of accuracy up to values of the order of 99.9 percent absorption. Coordinated controls permit absorbance measurements to a precision of 0.2—0.5 percent over a linear range from a few milliabsorbance units to 3 absorbance units.

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention as defined in the claims.

What we claim is:

1. An atomic absorption spectroanalysis system comprising a burner for generating a flame,
two radiation sources, each said source generating a characteristic radiation,
two pairs of radiation sensors, each pair being responsive to one of said sources,
an optical system for passing radiation from each source along a first path through said flame for sensing by the corresponding first sensors of each said paris of sensors to produce I signals, and passing radiation from each source along a second path outside of said flame for sensing by the corresponding second sensor of each said pairs of sensors to produce $I_o$ signals, a first logarithmic circuit arrangement including a first logarithmic converter responsive to the output of a first sensor of one pair for providing a signal proportional to log I as a function of the output of a first radiation source and a second logarithmic converter responsive to the output of a second sensor of said one pair for providing a signal proportional to log $I_o$ as a function of the output of a first radiation source, and a first summing network responsive to said first and second logarithmic converters to provide, as an output, a log $I/I_o$ signal, a second logarithmic circuit arrangement including a third logarithmic converter responsive to the output of a first sensor of the second pair for providing a signal proportional to log I as a function of the output of the second radiation source and a fourth logarithmic converter responsive to the output of the second sensor of said second pair for providing a signal proportional to log $I_o$ as a function of the output of the second radiation source, and a second summing network responsive to said third and fourth logarithmic converters to provide as an output, a second log $I/I_o$ signal, compensation circuitry connected in each logarithmic circuit arrangement between the two logarithmic converters of each said logarithmic circuit arrangement for providing compensation for radiation absorption deviations of the radiation passing through said flame as a function of Beer's Law, and circuitry for establishing a signal ratio as a function of said first and second log $I/I_o$ signals.

2. The spectroanalysis system as claimed in claim 1 and further including means for modulating the radiation output of each said radiation source and synchronous demodulation circuitry comprising a demodulation circuit for demodulating the output signal of each said sensor, each said compensation circuit being connected between the outputs of the two demodulation circuits associated with each particular source for applying a compensation signal to the inputs of the logarithmic converters associated with that source.

3. The spectroanalysis system as claimed in claim 2 wherein each said compensation circuitry includes a feedback amplifier, a control for adjusting the gain of said feedback amplifier, and a voltage dividing network for subtracting a portion of the signal produced by radiation in said second path as a function of absorbance so that the absorbance response of said system is a linear function of the concentration of the constituent in said flame.

4. The spectroanalysis system as claimed in claim 1 and further including a servo feedback loop connected to the output of each said summing network for providing a zeroing adjustment of said log $I/I_o$ signal while a known standard or blank is being introduced into said flame.

5. The spectroanalysis system as claimed in claim 1 wherein said circuitry for establishing a signal ratio includes an output device responsive to each said summing network and further including circuitry for applying the output of one of said summing networks as a reference signal to the output device responsive to the other of said summing networks to provide compensation for variations in flame conditions.

6. The spectroanalysis system as claimed in claim 5 and further including mode selector mechanism for selectively applying the outputs of said summing networks to their corresponding output devices and applying both of said outputs to one of said output devices.

7. The spectroanalysis system as claimed in claim 1 and further including an adjustable scale expander circuit responsive to the output of each said summing network for modifying the magnitude of the output of said summing networks.

8. The spectroanalysis system as claimed in claim 1 and further including synchronous demodulation circuits corresponding to and responsive to the output of each said sensor, each said demodulation circuit converting an AC signal produced by its associated sensor to a DC signal for application to the corresponding logarithmic converter, and a clock source for applying signals simultaneously to said radiation sources and said demodulator circuits.

9. The spectroanalysis system as claimed in claim 8 wherein each said compensation circuitry includes a feedback amplifier, a control for adjusting the gain of said feedback amplifier, and a voltage dividing network for subtracting a portion of the signal produced by radiation in said second path as a function of radiation absorbance in said first path so that the absorbance response of said system is a linear function of the concentration of a constituent in said flame.

10. An atomic absorption spectroanalysis system comprising
a radiation source,
a radiation sensor,
a burner structure for generating a flame inserted into the optical path between said source and said sensor,
said burner structure including a fuel line, means for connecting a source of fuel to said fuel line, an oxidant line, means for connecting a source of oxidant to said oxidant line, a chamber connected to said fuel and oxidant lines to mix the fuel and oxidant, means for introducing a sample to be analyzed into said chamber for mixing with the fuel and oxidant, and a burner head mounted on said chamber for defining the configuration of flame relative to said optical path, said system being characterized by the provision of a fixed restriction defining a circular unobstructed flow control orifice in each of said fuel and oxidant lines between and spaced from the respective fuel and oxidant source connection means and said chamber, and pressure adjusting means disposed in each of said fuel and oxidant lines between each said fixed restriction and said connection means for adjusting flow through said fuel and oxidant lines.

11. The system as claimed in claim 10 further characterized in that each said orifice has a diameter in the range of 0.024—0.032 inch.

12. The system as claimed in claim 10, further characterized by the provision of a second radiation source, both of said sources being hollow cathode tubes, three additional radiation sensors, each set of two of said radiation sensors being associated with and responsive to a corresponding hollow cathode tube,
an optical system for passing radiation from each tube along a first path through said flame for sensing by the corresponding first sensor of each set to produce I signals and along a second path outside of said flame for sensing by the corresponding second sensor of each set to produce $I_o$ signals,
and a logarithmic amplifier arrangement responsive to the outputs of each set of sensors for establishing first and second log $I/I_o$ signal ratios as a function of the effect of the flame on the radiation from said tubes in said first path,
said amplifier arrangement including a logarithmic amplifier corresponding and responsive to each sensor for producing an output as a logarithmic function of the signal from that sensor, a summing network responsive to the outputs of the amplifiers corresponding to each tube for providing, as an output, a log $I/I_o$ signal, an output device for displaying said first log $I/I_o$ signal ratio, and circuitry for applying said second log $I/I_o$ signal ratio to said output device to provide compensation for variations in flame conditions.

13. The system as claimed in claim 12 wherein said logarithmic amplifier arrangement further includes compensation circuitry associated with each said tube and connected between the outputs of each said set of radiation sensors for subtracting a portion of each said $I_o$ signal from that $I_o$ signal and the corresponding I signal to provide compensation for radiation absorption deviations of the radiation passing through said flame as a function of Beer's Law.

14. The system as claimed in claim 13 wherein said logarithmic amplifier arrangement further includes an adjustable scale expander amplifier circuit responsive to the output of each said summing network for modifying the magnitude of the output of said summing networks.

15. An atomic absorption spectroanalysis system comprising a burner for generating a flame, a radiation source for generating a characteristic radiation, a pair of radiation sensors, an optical system for passing radiation from said source along a first path through said flame for sensing by a first sensor to produce an $I$ signal, and passing radiation from said source along a second path outside of said flame for sensing by the second sensor to produce an $I_o$ signal, compensation circuitry associated with said radiation source and connected between the outputs of said two sensors for subtracting a portion of said $I_o$ signal from both said $I$ and $I_o$ signals to provide compensation for radiation absorption deviations of the radiation passing through said flame as a function of Beer's Law, and circuitry for generating an output signal as a function of the ratio between the compensated $I$ and $I_o$ signals.

16. The spectroanalysis system as claimed in claim 15 wherein said compensation circuitry includes a feedback amplifier, a control for adjusting the gain of said feedback amplifier, and a voltage dividing network for subtracting a portion of the signal produced by radiation in said second path as a function of absorbance so that the absorbance response of said system is a linear function of the concentration of a constituent in said flame.